(12) United States Patent
Saint Georges et al.

(10) Patent No.: US 8,971,720 B2
(45) Date of Patent: Mar. 3, 2015

(54) LOW LATENCY DATA TRANSMISSION NETWORK

(71) Applicant: AOptix Technologies, Inc., Campbell, CA (US)

(72) Inventors: Eric Saint Georges, Campbell, CA (US); Joseph Shiran, Palo Alto, CA (US); Scott Alan Young, Campbell, CA (US)

(73) Assignee: AOptix Technologies, Inc., Campbell, CA (US)

( * ) Notice: Subject to any disclaimer, the term of this patent is extended or adjusted under 35 U.S.C. 154(b) by 171 days.

(21) Appl. No.: 13/799,457

(22) Filed: Mar. 13, 2013

(65) Prior Publication Data

US 2014/0241711 A1    Aug. 28, 2014

Related U.S. Application Data

(60) Provisional application No. 61/770,571, filed on Feb. 28, 2013.

(51) Int. Cl.
*H04B 10/00* (2013.01)
*H04B 10/27* (2013.01)
*H04B 10/112* (2013.01)

(52) U.S. Cl.
CPC ............ *H04B 10/27* (2013.01); *H04B 10/1129* (2013.01)
USPC ............................. 398/164; 398/138; 398/128

(58) Field of Classification Search
USPC .......................................... 398/164, 138, 128
See application file for complete search history.

(56) References Cited

U.S. PATENT DOCUMENTS

| | | | | |
|---|---|---|---|---|
| 4,850,044 | A  * | 7/1989 | Block et al. .................... | 398/118 |
| 5,245,680 | A  * | 9/1993 | Sauter ............................. | 385/24 |
| 5,754,948 | A  * | 5/1998 | Metze .......................... | 455/41.2 |
| 5,923,451 | A  * | 7/1999 | Karstensen et al. ........... | 398/164 |
| 6,038,048 | A  * | 3/2000 | Harris et al. ................... | 398/156 |
| 6,650,844 | B1 * | 11/2003 | Davies et al. ................. | 398/164 |
| 6,661,940 | B2 * | 12/2003 | Kim ................................ | 385/15 |
| 6,832,014 | B1 * | 12/2004 | Vogley ........................... | 385/16 |
| 7,010,233 | B2 * | 3/2006 | Lindblad ....................... | 398/164 |
| 7,035,549 | B2 * | 4/2006 | Davies et al. ................. | 398/164 |
| 7,266,295 | B2 * | 9/2007 | Ovadia et al. .................. | 398/51 |
| 8,095,013 | B2 * | 1/2012 | Ozeki et al. ................... | 398/115 |
| 8,237,137 | B2 * | 8/2012 | Saitou et al. .................. | 250/551 |
| 8,289,944 | B2 * | 10/2012 | Rofougaran ................... | 370/344 |
| 8,687,961 | B2 * | 4/2014 | Tan et al. ......................... | 398/66 |
| 2003/0048497 | A1 * | 3/2003 | Cotter et al. ................... | 359/109 |
| 2012/0308235 | A1 | 12/2012 | Pusarla et al. | |
| 2014/0241711 | A1 * | 8/2014 | Saint Georges et al. .......... | 398/5 |

* cited by examiner

*Primary Examiner* — Agustin Bello
(74) *Attorney, Agent, or Firm* — Fenwick & West LLP (57) ABSTRACT

A communications networking having reduced transmission latency and improved reliability is described. To reduce signal transmission latency, network management data is removed from a data stream to prioritize the transmission of payload data at higher transmission rates. Management data is returned to the data stream in such a way that it minimizes an impact to payload transmission rates. To improve communications network reliability, the network is configured to form a primary communication path and a redundant communication path. Upon failure of a transceiver at one node, the network engages redundant transceivers on a per-node basis thereby using a segment of the redundant communication path. The data stream is returned to the primary communication path upon circumvention of the failed transceiver.

28 Claims, 7 Drawing Sheets

LOW LATENCY DATA TRANSMISSION NETWORK

BACKGROUND

The present disclosure relates generally to data transmission through a communications network, and more specifically to low latency data transmission.

The transmission of data between remote computing systems is a common occurrence. To facilitate the transmission of data, communications networks have been developed to relay data quickly and reliably between computing systems physically located across the globe. However, the amount of data that can be transmitted between any two computing systems in a communications network is constrained by the bandwidth linking the two computing systems. The amount of bandwidth available to transmit data depends at least upon the medium used for communication (e.g., wired Local Area Network, wireless radio waves, fiber optics, coaxial cables, etc.) including any necessary hardware, as well as the manner in which the computing systems are controlled to exchange data.

SUMMARY

To increase the speed at which data are sent and received through a communications network, and to improve the reliability of that network, embodiments of the present disclosure include mechanisms for exchanging different types of data between nodes of the communications network.

In one implementation, a communications network includes a series of communication nodes configured to exchange (e.g., send and receive) data streams with other communications nodes. Each data stream is sent from a source node through the network of nodes to a destination node. Each node may include a computing device for performing computing operations on the data stream. Most nodes of the network include at least two transceiver systems that are communicatively coupled to each other. Each of these transceiver systems is configured to communicate with a similar transceiver system on an adjacent node. At each node, a prior transceiver system exchanges messages with an upstream node (i.e., in the direction of the data source), and a subsequent transceiver system exchanges messages with a downstream node (i.e., in the direction of the data destination). Each transceiver system includes at least two transceivers, each configured to exchange data with a similar transceiver on an adjacent node. In some embodiments, each of the two transceivers operates using a different communication channel. For example, one transceiver may operate using free space optical (FSO) frequencies, while the other may operate using radio frequencies (RF).

In one implementation, the reliability of the communications network is improved by configuring each node of the network to include two primary transceiver systems, as well as two backup (or redundant) transceiver systems. Thus, between any two nodes of the network, both a primary and a redundant communication path can be established. Upon detection of a failure of a transceiver system (or of a transceiver), the network engages one or more redundant transceiver systems on a per-node basis to circumvent the failed transceiver or transceiver system. The communications network then makes use of the redundant communications path rather than the primary communications path around the node/s where the fault was detected.

After circumventing the faulty transceiver system or transceiver, the data stream is routed back into the primary communication path, leaving the redundant transceiver systems at all other nodes in the communications network unengaged. Using this configuration, the communication system can accommodate additional deficiencies at other nodes of the system without interrupting service or reducing the data stream transmission rate.

In one implementation, management data can be dynamically removed from the data stream once it is received at a given node. After the management data has been processed and acted upon by a computing device associated with the node, the management data itself, or responses to the management data (e.g., results of instructions to be performed or node monitoring data), are then added back into the data stream. In one embodiment, once management data initially transmitted on a first communications channel, has been removed from the first communications channel and processed by a node, subsequent management communication are transmitted using either the first or a second communications channel. In other embodiments, after processing, the management data can be transmitted by injecting it back into the first communications channel.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Transceiver System

Figure 1:
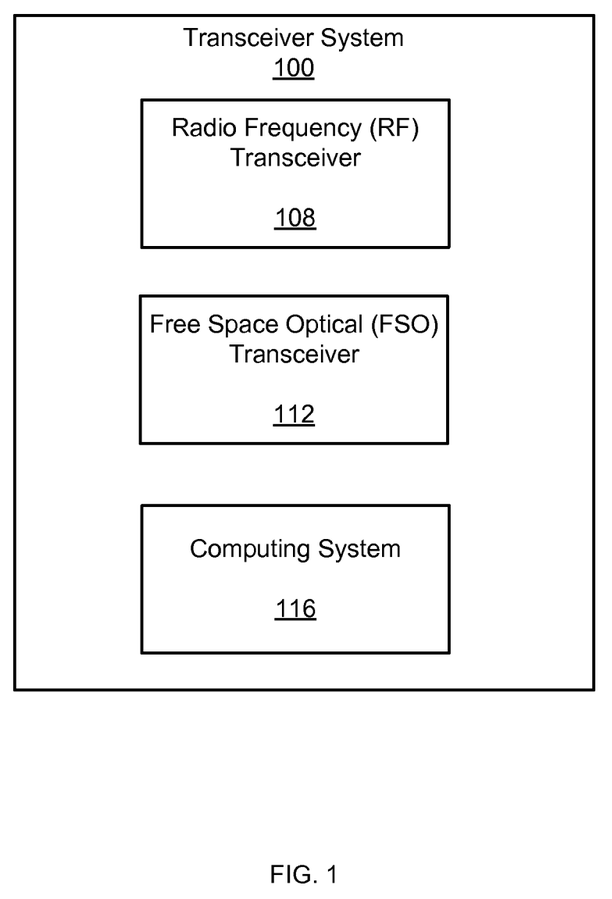
FIG. 1 is a block diagram of a transceiver system used for exchanging information with another similar transceiver system, in an embodiment.

FIG. 1 illustrates an example transceiver system 100 for exchanging information with another similar transceiver system located remotely at a distance from the transceiver system 100. In this example, the transceiver system 100 includes a radio frequency ("RF") transceiver 108, a free space optical ("FSO") transceiver 112, and a computing system 116. In other implementations of the transceiver system 100, other or additional types of transceivers may be used.

The transceiver system 100 is configured to communicate data through the open air using its transceivers. To protect against environmental deterioration or destruction of the internal components of the system 100, the system 100 is contained within a housing (not shown). In one embodiment, the housing includes one or more apertures for through which the transceivers send and receive signals carrying data. Each aperture is transparent at least to the signals of the transceiver/s it is associated with. In one embodiment, the housing may also provide internal environmental control of temperature, humidity, and other similar factors. For example, the housing may employ a heater to control temperature and an air conditioning unit to control temperature and humidity. With respect to the apertures, a heater, wiper, or another mechanism may be present to limit occlusion of the aperture.

The transceivers are mounted on a moving platform (not shown) that is connected to an assembly (also not shown) that allows the transceivers to change their orientation within a range of motion on at least one axis in order to assist the transceivers in forming communication links with the remote transceivers they are communicating with. For example, the assembly may be implemented as a gimbal assembly, although other assemblies can be used to change the orientation of the transceivers.

Further detail regarding an example transceiver system 100 is described in U.S. patent application Ser. No. 13/149,804, titled "Integrated Commercial Communications Network Using Radio Frequency and Free Space Optical Data Communication," which was filed on May 31, 2011, and is incorporated herein by reference in its entirety.

The transceivers (e.g., RF 108 and FSO 112) of the transceiver system 100 are used to both transmit and receive (collectively, "exchange") data signals with another transceiver system. That is, each transceiver can act as both a transmitter and as a receiver, as needed. Each individual transceiver of a first transceiver system is configured to communicate with a single other transceiver located on a second transceiver system physically removed from the first transceiver system, and often located at another node of the communications network.

Each transceiver of a system communicates with a corresponding remote transceiver at another node a different communications channel from the other transceivers of the system. A communications channel includes those physical mechanisms by which two transceivers communicate with one another. RF and FSO are examples of two different types of communications channels that can be used, however others are possible as well. Generally the communications channels of a transceiver system are distinct from each other in at least one way. For example, the FSO 112 and the RF 108 transceivers are distinct with respect to the wavelength of radiation used to transmit the data stream. Other distinctions between communications channels may include the physical location or spatial distance between transceivers, the time of transmission, the encoding technique used, the multiplexing technique used, and/or bit rate used. Although in this example, only the RF 108 and FSO 112 transceivers are shown, other types of transceiver may be incorporated into the system 100 using other communications channels. In this case, both the FSO 112 and RF 108 transceivers can transmit at approximately between 2 and 3 Gbps ("gigabits per second"), although higher transmission rates are possible.

Transceiver system 100 also includes a computing system 116 configured to communicate with the RF 108 and the FSO 112 transceivers to control the transmission, reception, and processing of data. The computing system 116 is configured to analyze incoming data streams, process management data regarding the health, status, and/or operation of the transceiver system, and transmit responses to management data inquiries.

As introduced above, each transceiver system 100 is configured to communicate with another transceiver system 100 at the same node or another node of the network that is physically removed. To send data over large physical distances, multiple sets of transceiver systems are used to relay signals between each set of approximately physically co-located transceiver systems. To relay signals, the computing systems 116 of each set are communicatively coupled to each other. The coupling and operation of transceiver systems is further described with respect to FIGS. 2 and 3 below.

The computing systems 116 may also be communicatively coupled to computers (not shown) external to the transceiver system 100. These external computers can be both a source of data to be transmitted by the transceiver system 100, as well as a destination for data that has been received by the transceiver system 100.

Communications Network

Figure 2:
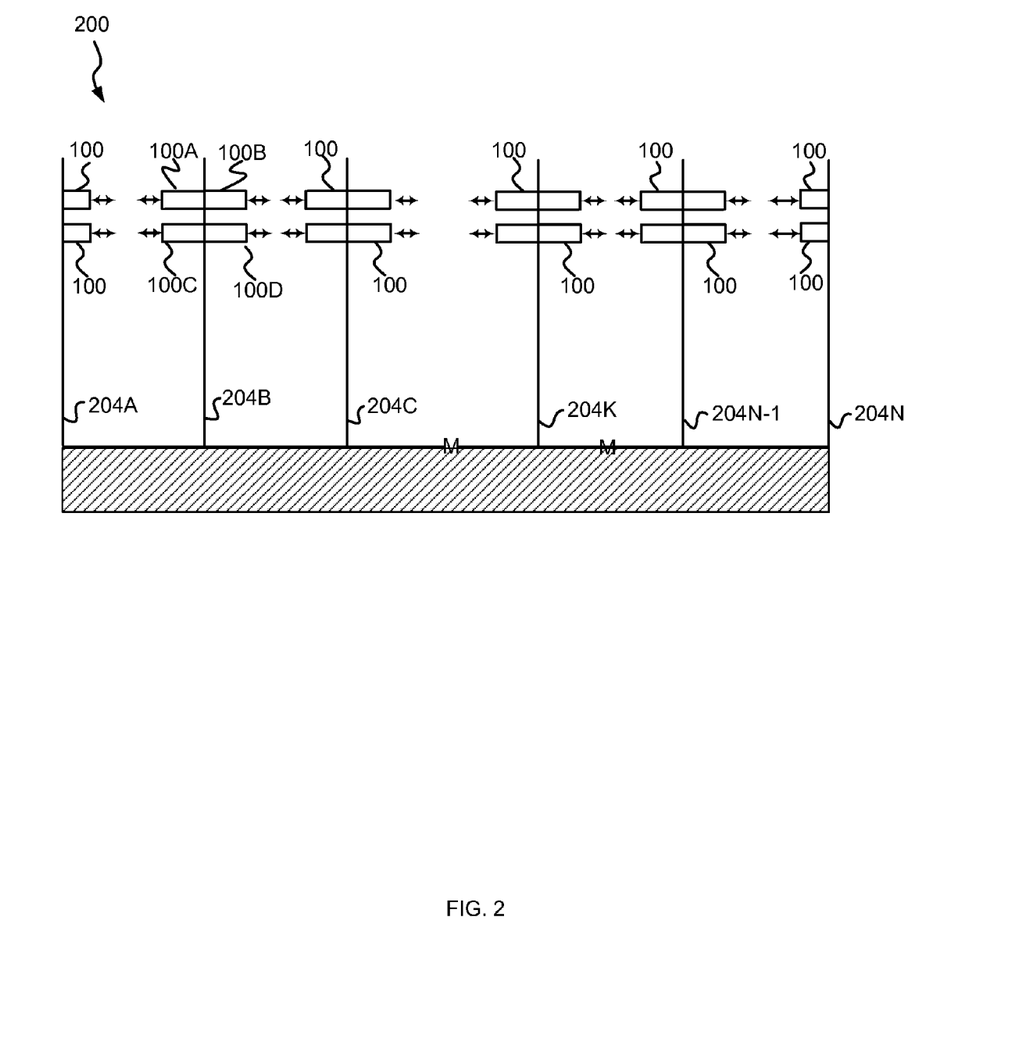
FIG. 2 illustrates an example communications network in which multiple transceiver systems 100 are used to transmit data long physical distances through the network, in an embodiment.

FIG. 2 illustrates an example communications network 200 in which multiple transceiver systems 100 are used to transmit data over a distance through the network.

A communications network 200 includes a plurality of communication nodes 204A to 204N (collectively "204" for brevity), where N is any number larger than 1. Generally, each node 204 of the network 200 includes four transceiver systems 100. Two of the transceiver systems 100 are oriented in opposing directions, as illustrated by the systems 100A and 100B on the node 204B, in order to transmit and receive in both upstream and downstream directions. Two of the transceiver systems 100 are oriented in the same direction, as illustrated by the systems 100A and 100C on the node 204B, so as to communicate with corresponding transceiver systems 100 at the neighboring node 204. Orienting two transceiver systems 100 in the same direction allows for both a primary communication path and a redundant communication path that can be enabled on a per-node basis to improve the uptime and reliability of the communications network as a whole. The redundant communication path is explained in more detail in the context of FIGS. 3A and 3B.

For clarity, nodes, transceiver systems, and transceivers may be characterized by a function they perform in a particular instance (e.g., "receiving transceivers," and "sending transceivers"), the communication path that the transceiver or transceiver system is part of (e.g., "redundant transceivers," and "primary transceivers"), the relative location in a communication path in light of a transmitted data stream (e.g., "prior transceiver," and "subsequent transceiver"; "upstream node" and "downstream node"), or combinations thereof (e.g., "subsequent redundant transceiver").

Most of the nodes 204 (e.g., intermediate nodes 204B to 204N-1) in the network 200 include four transceiver systems 100 as described above such that each node functions as a sending node and a receiving node. In contrast, the nodes 204A and 204N at either end of the network ("terminal nodes") include two transceiver systems for communication with the adjacent intermediate node. As end points of the network 200, these terminal nodes 204A and 204N do not need to transmit to another node, and thus are configured to transmit and receive in a single direction. The terminal nodes 204A and 204N are connected to external computing devices that serve as the source and destination for the data stream transmitted by the network 200. The terminal nodes 204A and 204N thus serve as the point of exchange for data switching between the communications network 200 and an external computing network.

While each example node 204 is described as having either two or four systems 100, it will be appreciated that any number of the systems 100 may be used at each node 204 without departing from the concepts described herein. Further, while the example network 200 includes the nodes 204A to 204N arranged in a single line, it will be appreciated that analogous networks may have branches extending in multiple directions from any node 204 in the network. In some implementations, only a single transceiver (e.g., the transceiver 108, 112, or other type of transceiver) per system 100 is used. In one embodiment, any node of the network may act as a terminal node for coupling to an external computing network, and the terminal nodes may include more than two transceiver systems and/or may be configured to communicate data in more than one direction.

Primary and Redundant Communication Paths

Figure 3A:
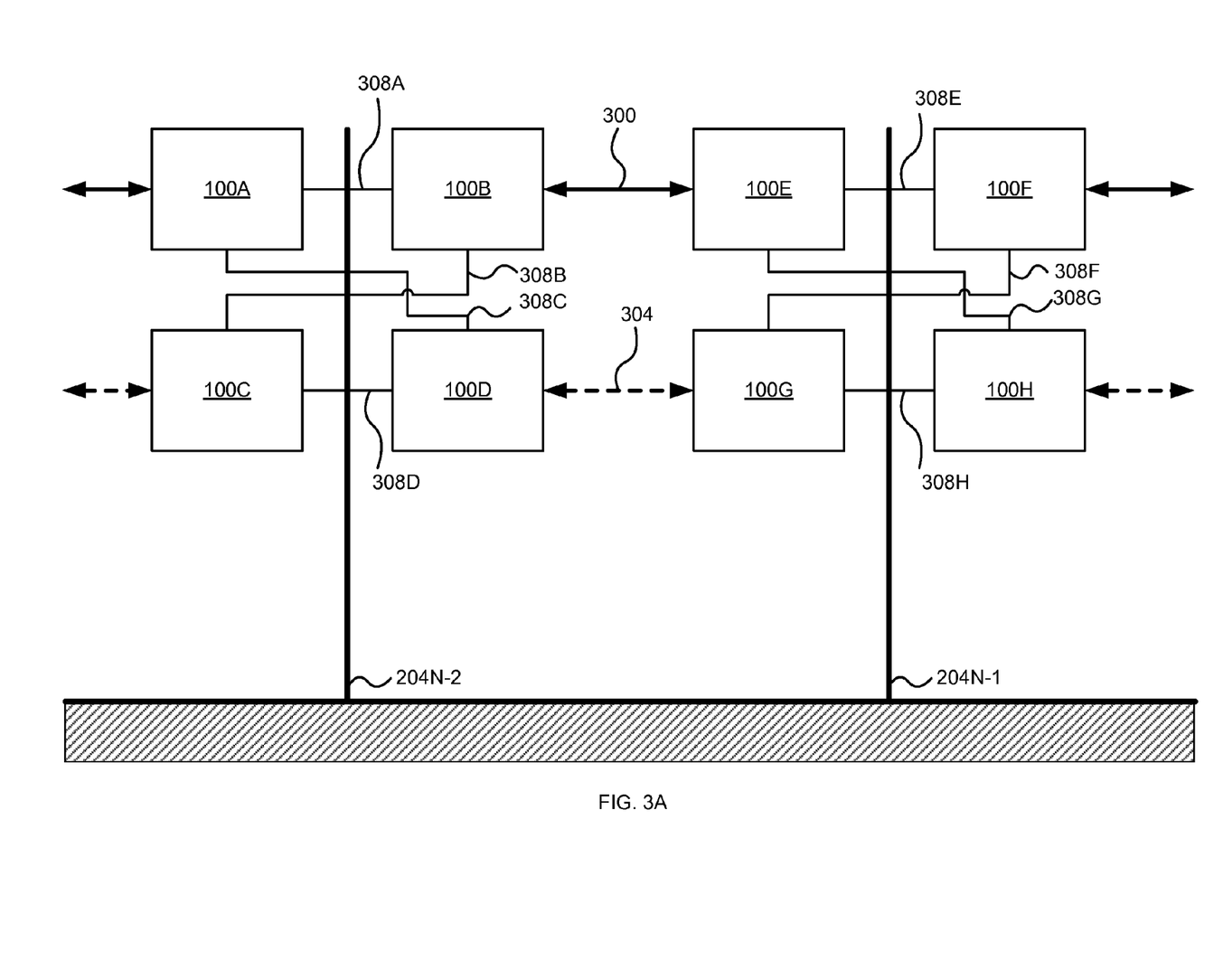
FIG. 3A is an illustration of a primary communication path through a communications network, in an embodiment.

As shown in FIG. 3A, example communications network 200 is configured to include a primary communication path 300 and a redundant communication path 304. Generally, a data stream is transmitted through the network 200 from source to destination using the primary communication path 300. After circumventing the faulty system (e.g., 100B as described below in FIG. 3B) by using a portion of the redundant communication path 304, the data stream may be returned to the primary communication path 300. In this embodiment, use of the redundant path 304 at the remaining nodes is reserved for when the primary communication path 300 is unavailable. Generally, however, the primary 300 and redundant communications paths 304 may be used interchangeably for any reason. An advantage of this primary/redundant network construction is that multiple faults at many nodes throughout the network 200 can be accommodated without compromising the operation or performance of the communications network 200.

FIG. 3A illustrates both the primary communication path 300 and the redundant communication path 304. In this example, the data stream (e.g., the payload data packets and the management data packets that form the data stream) is transmitted, using a sending transceiver system, from either a data source or a prior node to node 204N-2. The data stream is received at node 204N-2 using transceiver system 100A, which is one of the transceiver systems of the primary communication path 300. The data stream may be received from a prior node, or through another mechanism, including both wired connections (e.g., Ethernet cable, optical fiber, etc.) and wireless connections (e.g., 3G, 4G, WiMax, LAN, etc.).

To relay the data stream to the next node 204N-1 in the network 200, the data stream is first communicated from transceiver system 100A to transceiver system 100B using a physical data link 308A. Types of physical links include, but are not limited to optical or electrical connectors including, for example, cables and printed circuit boards. Wireless data links, such as those previously described, may also be used to transmit the data stream instead of a physical link. As will be explained in more detail below, data links 308A, 308B, 308C, and 308D connect the transceiver systems 100 of a node (e.g., node 204N-2) to each of the other transceiver systems on the other side of the node.

Once the stream is received by transceiver system 100B through data link 308A, the transceiver system 100B then transmits the data stream to a corresponding transceiver system 100E of node 204N-1 in the primary communication path 300. The above-described process is then repeated for each subsequent node using transceiver systems of the primary communication path 300.

Figure 3B:
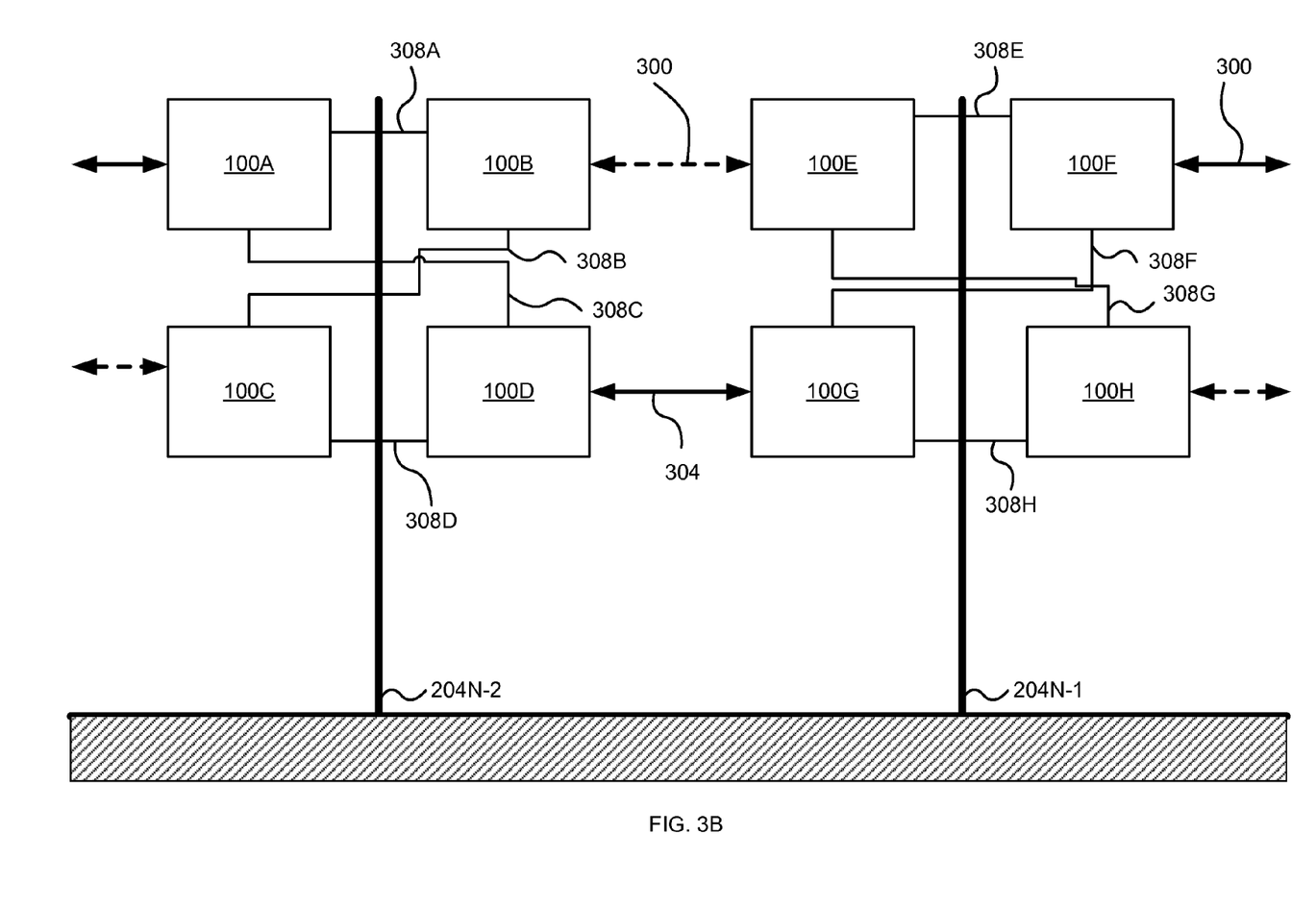
FIG. 3B is an illustration of a redundant communication path through a communications network, in an embodiment.

As shown in FIG. 3B, in the event that an operational fault is detected in, for example, transceiver system 100B, the communications network 200 may circumvent the faulty transceiver system using the redundant communication path 304. In this example, the transceiver system 100B is circumvented by transmitting the data stream received by transceiver system 100A through the data link 308C to the subsequent redundant transceiver system 100D. In some examples, the transceiver system 100B is deactivated using management data sent to the node. Transceiver system 100D, as a component of the redundant communication path 304, transmits the data stream to the corresponding redundant transceiver system in the redundant path at the next node—in this example transceiver system 100G at node 204N-1. The data stream may then be returned to the primary communication path 300 by transmitting the stream from the redundant transceiver system 100G through data link 308F to transceiver system 100F, which is a component of the primary communication path 300. Transmission can continue through the primary communication path 300 until another faulty transceiver system 100 is detected, at which point the above process is repeated to circumvent the fault.

In other examples, if transceiver system 100F is also faulty, the data stream can continue its transmission through the redundant communication path 304 by being transmitted to redundant transceiver system 100H through data link 308H. The data stream is then transmitted from transceiver system 100H to a corresponding downstream transceiver at a neighboring node in the redundant communication path 304 until the stream can be returned to the primary communication path 300, or alternatively received at a data destination.

While the above example process describes circumventing faulty transceiver systems 100 using redundant transceiver systems, in other examples the redundant communication path 304 can instead be formed by using the second transceiver within each transceiver system. For example, referring to FIG. 1, the primary communication path 300 can be defined by FSO transceivers 112 at each node 204 in the network 200, and the redundant communication path 304 defined by RF transceivers 108, or vice versa. Upon detection at a fault of one of the FSO transceivers 112 in the primary communication path 300, the data stream can be routed to the redundant communication path 304 formed by the RF transceivers 108 at the nodes 204 of the communications network 200. As described above, the data stream can be transmitted through the RF transceivers 108 at the various nodes 204 until the fault (or faults) in the FSO transceiver/s 112 is circumvented. Alternatively, the communication paths can be defined by a combination of transceivers 108 and 112 and transceiver systems 100.

Selective Transmission of Management Data for Reducing Network Latency

The above process for circumventing a faulty transceiver system 100 or transceiver 108 or 112 can be initiated, controlled, monitored, and terminated using, among other methods, management data that is transmitted as part of (or interspersed among or between) the data stream. Management data received at a node 204 is configured to be executed by the computing system 116 of a transceiver system 100. Management data can turn transceivers on and off. Management data can also route the data stream between the primary communication path 300 and the redundant communication path 304.

Management data may also be used for various other management functions. For example, management data may include instructions to the computing system/s 116 of one or more transceiver systems 100 to perform resource monitoring operations to determine the performance and efficiency of transceiver system 100. Management data may also include instructions for a node to report the round-trip time between nodes 204 in the network 200. Management data may also include instructions for individual transceiver systems to report their "health" including whether or not they are having or have had any operational faults.

Figure 4:
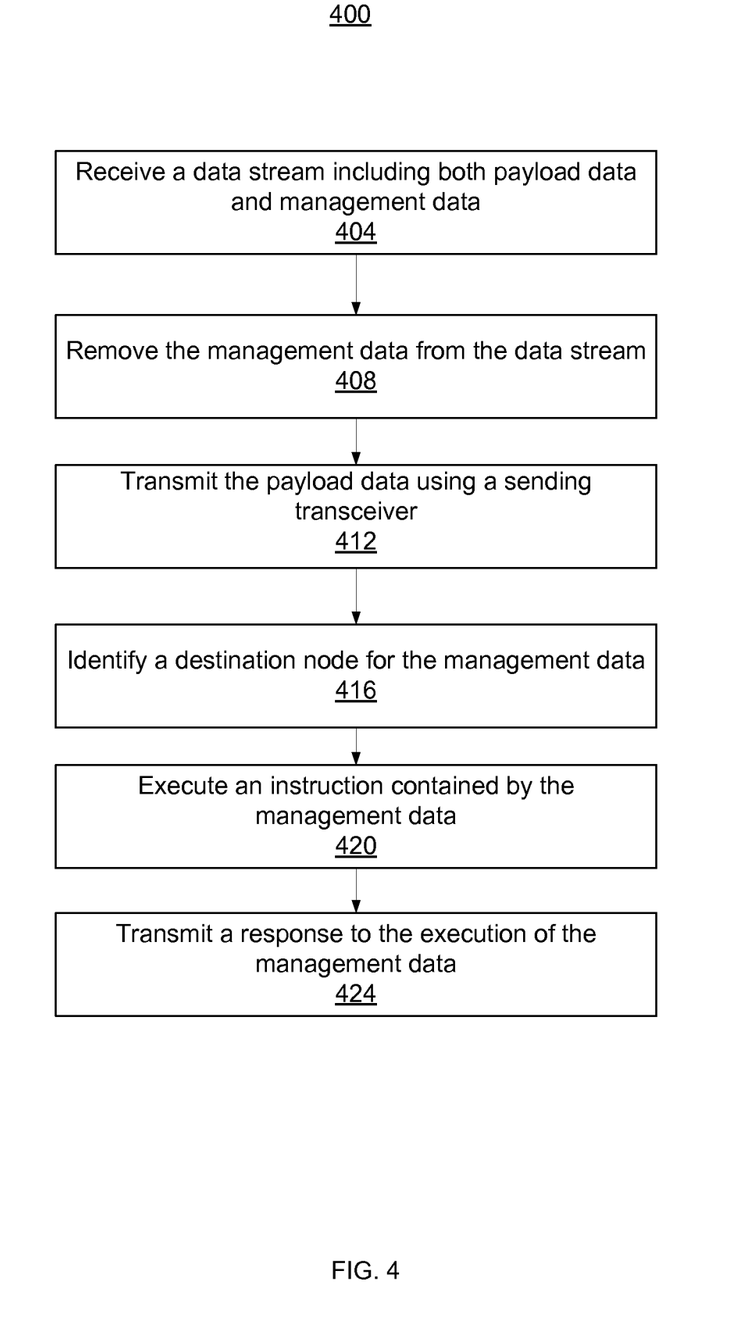
FIG. 4 is a method flow diagram illustrating a process for handling the transmission of data through a communications network, in an embodiment.
Figure 5:
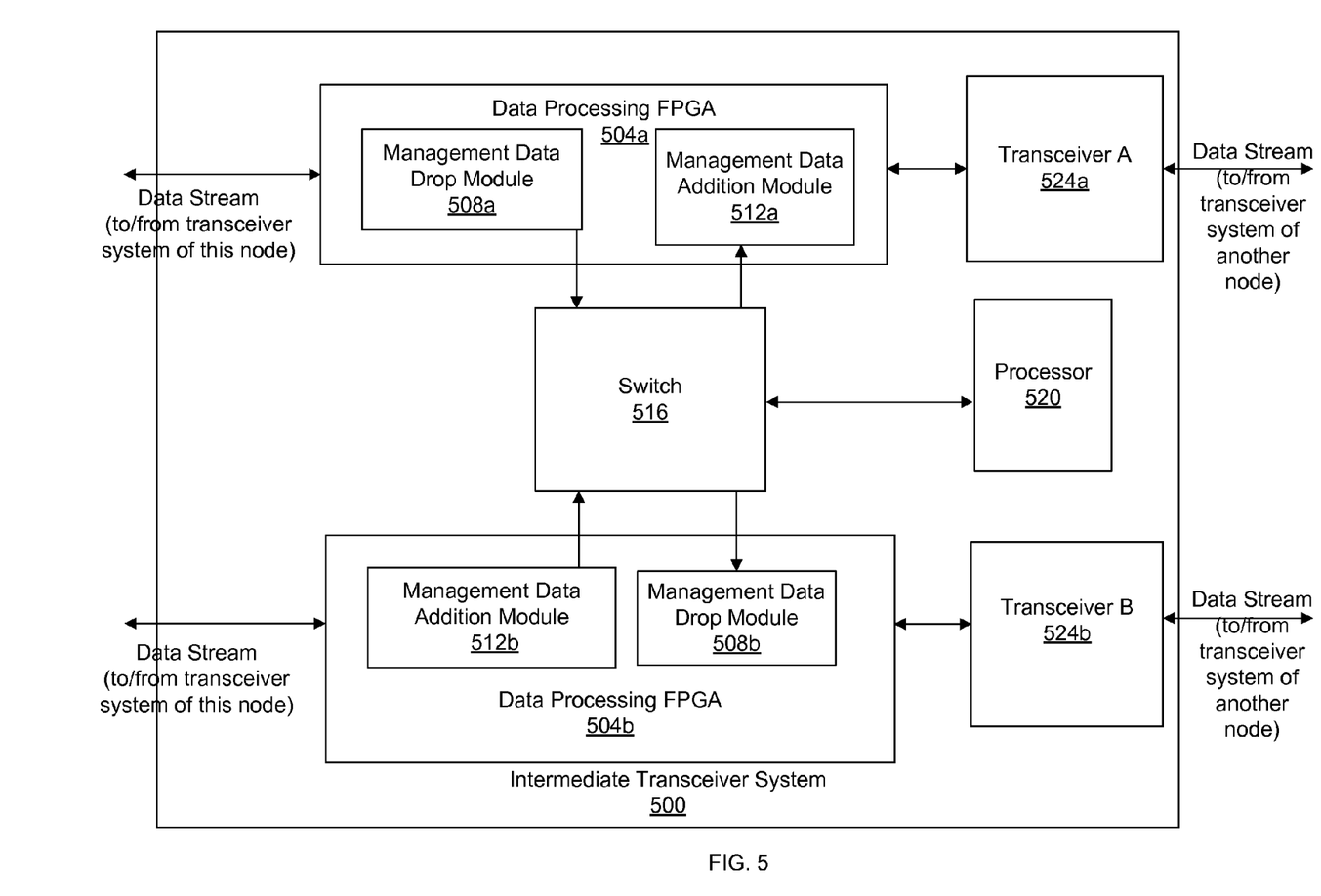
FIG. 5 is a block diagram of a transceiver system configured to process a data stream including management and payload data within a data stream, in an embodiment.
Figure 6:
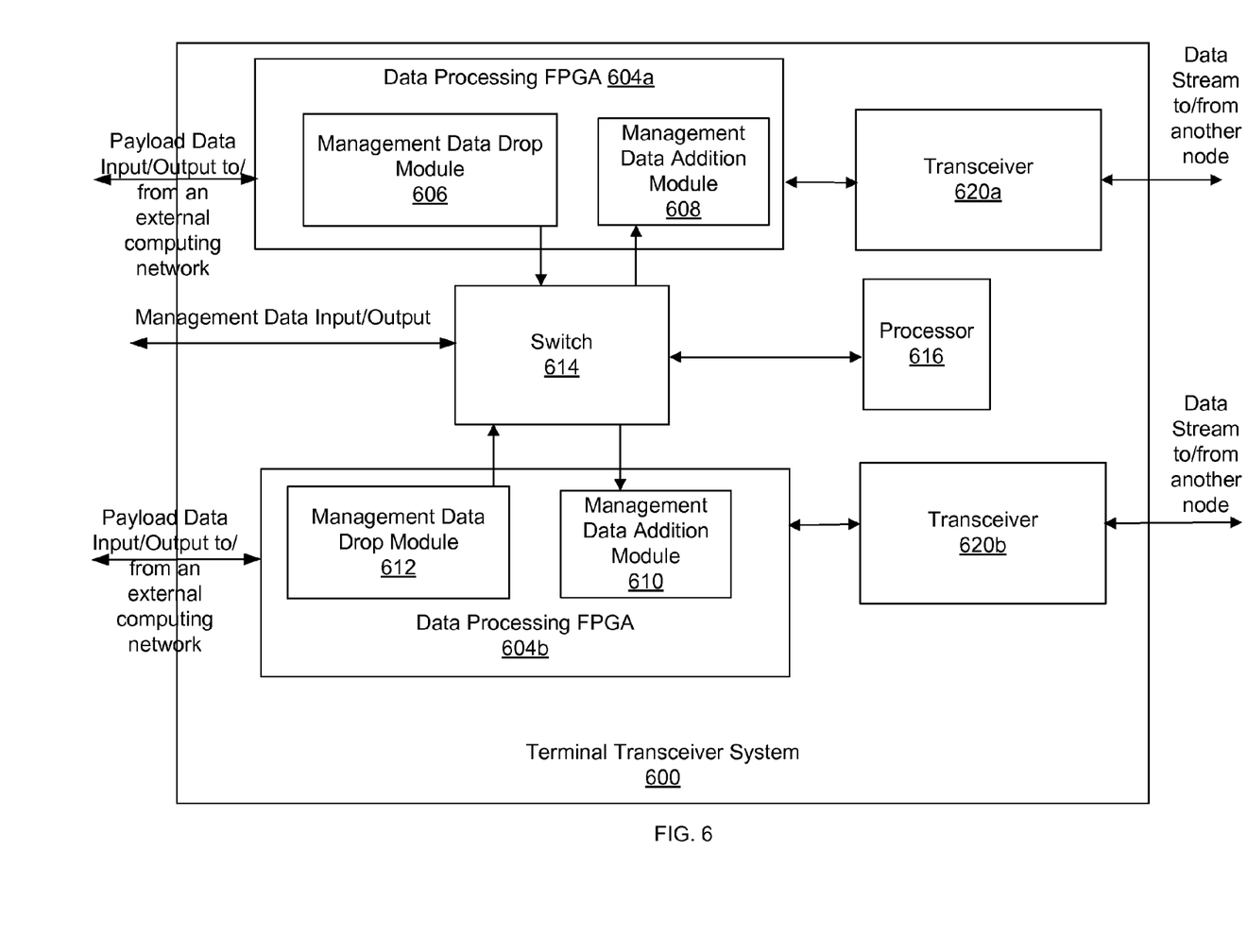
FIG. 6 is a block diagram of a terminal transceiver system configured to act as an interface between external computing systems and other nodes of a communications network, in an embodiment.

While management data is useful to the operation of the network, it does not necessarily need to be sent at the expense of payload data. Networks have limited bandwidth, and often it is preferable to use bandwidth for transmitting payload data. In order to reduce the latency (or alternatively increase the speed or transmission rate) of payload data transmitted through the network 200, management data can be removed from the data stream and later re-introduced to the data stream in a way that reduces interference with the transmission of the payload data. One example of such a method 400 is shown in FIG. 4 and described below. Specific implementations of transceiver systems 100 for carrying out method 400 are illustrated in FIGS. 5 and 6 and are also described below.

In example method 400, a data stream that includes both payload data and management data is received 404 at a transceiver (e.g., an RF transceiver 108 or an FSO transceiver 112) of a transceiver system 100 of a node 204. As the data stream arrives it is processed by the transceiver system. Management data in the data stream is removed 408 from the data stream, while payload data is communicated to another transceiver system on the same node for transmission 412 to the next node in the network. The management data is then handled asynchronously from the remainder of the data stream, so that the payload data does not have to wait to be sent pending actions related to the management data.

Thus, while the payload data is being separately sent and received by the transceiver system, the transceiver system processes the management data to identify 416 a destination node for the management data. Example destinations include either the node at which the management data has been received, a downstream (or subsequent) node, or an upstream (or prior) node. Management data may have more than one destination node. Assuming that the destination node is the node that has received the management data and removed it from the data stream, the node then executes 420 an instruction contained by the management data.

In some instances, execution of instructions contained within management data will result in a response being generated. In other instances, the management data will not be relevant to the node it has arrived at. In both cases, the responses or management data are transmitted 424 to the appropriate node (or to the data source or destination) based on the instructions contained within the management data. The management data (or response thereto) is sent by inserting the management data (or response) into an outgoing data stream for transmission by the appropriate transceiver system 100 on the node 204.

Transceiver Systems Configured to Prioritize the Transmission of Payload Data

FIG. 5 illustrates an example of an intermediate transceiver system 500 used to perform some or all of the method 400 at an intermediate node 204. An intermediate transceiver system 500 is part of an intermediate node 204 that is in communication with other nodes. This is in contrast to a terminal node that is in communication with both a data source or a data destination, as well as an intermediate node.

Transceiver system 500 includes transceivers 524, which are generalized examples of the transceivers 108 and 112 from transceiver system 100. Transceiver system 500 also includes a computing system (not labeled), which includes data processing field programmable gate arrays ("FPGAs") 504a and 504b ("504"), a switch 516, and a processor 520. The use of FPGAs is exemplary, and other types of components may be used along with or instead of FPGAs, including, for example, application specific integrated circuits (ASICs). Each FPGA 504 includes a management data drop module 508a and 508b ("508"), and a management data addition module 512a and 512b ("512"). In addition to sending and receiving data streams using the transceivers 524a and 524b ("524"), transceiver system 500 is configured to add and remove management data and responses from the data stream, process the management data, and generate responses.

In performing method 400, transceiver system 500 receives a data stream that includes both payload data and management data. The data stream may, for example, be received using transceiver 524b from another node in the network. Once received, the data stream is communicated from the transceiver 524b to the data processing FPGA 504b.

Within the data processing FPGA 504b, the management data drop module 508b removes the management data from the data stream and communicates it to the switch 516. The management data drop module 508b removes the management data by first identifying the management data. This identification can be accomplished by using information contained in a header portion of each management data packet (transmitted as part of the stream), identifying a pattern in the transmitted data that is specific to management data, or by executing an instruction that identifies and selects the management data within the data stream. The remainder of the data stream (e.g., payload data) is ignored by the management data drop module 508b. The remainder of the data stream is electronically transmitted to another transceiver system 100 of the node 204 for transmission to a subsequent node in the network.

Having been removed by the management data drop module 508b, the management data is communicated by the switch 516 to the processor 520. In one example, the switch 516 is a Open System Interconnection (OSI) layer ⅔ Ethernet switch configured to determine an IP address of incoming packets, particularly packets of management data. By analyzing the header portion of the packet, the switch 516 identifies whether the destination node for the management data is the current node or another node. If the current node is the destination node, then the switch 516 provides the packet to the processor 520. If the destination node of the packet is not the current node, then the switch 516 provides the packet to the data processing FPGA 504a or 504b so that the packet can continue being transmitted to its destination. The switch 516 also receives responses and other data from the processor 520 and provides the response to a data processing FPGA 504a or 504b for transmitting the response to the source of the request.

The processor 520 analyzes the management data to identify a destination node for the data. The processor 520, which may include logic circuits, volatile and non-volatile memory, firmware, and/or software, is configured to execute instructions communicated by the management data.

If the destination node is the current node, the management data undergoes further processing by the processor 520. Any responses generated by the execution of management data instructions may be sent back to the switch 516 for transmission to the intended recipient, as determined by the instructions included within the management data.

The management data addition module 512 is configured to insert management data (or responses) back into the data stream in such a way so as to reduce the effect on the transmission rate/transmission speed of higher priority data (e.g., payload data). To accomplish this, the management addition module 512 may be configured to monitor the data stream for opportunities to insert the management data, such as periods of relative inactivity. Using periods during which lower quantities of payload data are being transmitted provides for better use of otherwise excess transmission capacity of the network without affecting the maximum bandwidth of the network under load. Management data may also be inserted between any given packet in the data stream.

In another embodiment, the management data addition module 512 inserts management data into the data stream without buffering the incoming data stream. Because a client data stream is not stopped or delayed, the transmission rate is increased to accommodate the additional bandwidth used to transmit the management data (e.g., increased from 2 Gbps to 2.5 Gps). In addition to the management data, the added transmission capacity can be used for framing, error correction, and/or error detection. This is multiplexed into the payload data. There is a limited number of bits that are used for management data. The switch 516, after processing the management data, can send it to an FPGA 504a or 504b to be inserted into the data stream. The switch 516 queues the management data in a transmission by providing the data when requested by the FPGA 504 such that the management data can be inserted into the stream without slowing or interrupting the flow of payload data. For example, an FPGA 504, upon identifying a gap in a transmission into which management data can be inserted without interrupting the flow of payload data, can request or retrieve management data queued at the switch 516 and insert it.

In one implementation, the processor 520 is configured to monitor the current available bandwidth (e.g., by time averaging throughput vs. capacity) in the primary and redundant communications path (e.g., communication path 300). The processor 520 may instruct the switch to send management data (or responses) using either the primary communications path 300 or the redundant communications path 304 depending on bandwidth availability, so as to reduce the latency of the primary path.

As an example of this, a data stream may be received using an FSO transceiver (for purposes of this example, transceiver 524b). The data stream may initially contain both management data and payload data. Once received, the management data drop module 508b communicates the removed management data through the switch 516 to the processor 520 while the payload data is transmitted to the next node. The destination node for the management data is identified as a subsequent node. The processor determines the available bandwidth and determines that the available bandwidth is below a threshold. The processor 520 then sends the management data back to the switch 516 with instructions that the management data is to be relayed to the next node in the network using the redundant communications channel (e.g., using the RF transceiver, which in this example is transceiver 524a). The management data is then added to the outgoing data stream using management data addition module 512a for transmission by transceiver 524a.

The data stream received by a transceiver may contain errors that were not present in the data stream transmitted by the prior node. The data in the data stream may be encoded to allow post-receipt reconstruction of the correct data stream, in order to reduce the need for retransmission. For example, the data stream may include additional forward error correction (FEC) bits to allow the data stream to be properly reconstructed after receipt. The data processing FPGAs 504 are configured to decode received data streams, and re-encode data streams to be transmitted. This helps prevents the accumulation of errors as the data stream travels across the network through multiple nodes. In one implementation, the received data stream is decoded and corrected before between handled by the management data drop module 508. Similarly, the data stream is re-encoded after the data stream has been modified (if at all) by the management data addition module 512.

Terminal Nodes

The configuration of transceiver systems in terminal nodes (i.e., nodes communicating with an intermediate node and either a data source or a data destination) is slightly different from that of intermediate nodes. An example terminal transceiver system 600 is illustrated in FIG. 6. A terminal transceiver system 600 may contain the same components as an intermediate transceiver system 500.

A terminal transceiver system 600 differs from an intermediate transceiver system 500 in terms of the flow of data. In a terminal transceiver system 600, the data processing FPGAs 604 are connected to an external computing network rather than being connected to another transceiver system on the node. Thus, payload data entering the network 200 from an external source enters through one of the data processing FPGAs 604. In implementations where the transceivers transmit at different speeds, this gives the provider of the data stream the option to directly choose the speed of transmission through selecting which data processing FPGA 604 will receive the data. Management data may also enter this way as well. Management data may also enter the transceiver system separately from the payload data through the switch 614. The management data may then be executed by processor 620 and responded to directly, or transmitted to subsequent nodes through the use of add 608/drop 612 modules as described above.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus.

Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for transmitting data through a communications network comprising a plurality of nodes, each node comprising a plurality of transceiver systems, the method comprising:
   receiving, using a receiving transceiver system of an intermediate node, a data stream comprising payload data and management data, the management data configured to monitor and control the nodes of the communications network;
   removing the management data from the data stream;
   transmitting the payload data using a sending transceiver system of the intermediate node;
   identifying, using the intermediate node, a destination node for the management data;
   responsive to identifying the destination node as the intermediate node, executing an instruction with respect to the intermediate node, the instruction contained within the management data; and
   transmitting, using the sending or receiving transceiver system, a response to the instruction.

2. The method of claim 1, wherein the data stream is received at a first transceiver of the receiving transceiver system, the first transceiver configured to transmit and receive data using an optical communications frequency.

3. The method of claim 2, wherein the response to the instruction is transmitted at the optical communications frequency using the first transceiver of the sending or receiving transceiver system.

4. The method of claim 3, wherein transmitting the response at the optical communications frequency using the first transceiver of the sending or receiving transceiver system comprises:
   identifying a gap between payload data packets in a transmitted data stream;
   inserting the response into the gap in the data stream;
   transmitting the response at the optical communications frequency using the first transceiver; and
   continuing uninterrupted transmission of the payload data.

5. The method of claim 4, wherein the first transceiver comprises:
   a switch to temporarily store the response; and
   a field programmable gate array (FGPA) to retrieve the response from the switch and insert the response into the data stream responsive to the gap being identified.

6. The method of claim 2, wherein the response to the instruction is transmitted at a second communications frequency less than or equal to the first communications frequency, the response transmitted using a second transceiver of the sending or receiving transceiver system.

7. The method of claim 6, wherein the second transceiver comprises a radio frequency transceiver configured to transmit and receive data at approximately 2.5 Gigabits per second.

8. The method of claim 2, wherein the first transceiver comprises a free-space optical transceiver configured to transmit and receive data at approximately 2.5 Gigabits per second.

9. The method of claim 1, wherein executing the instruction contained by the management data comprises:
   deactivating the sending transceiver system of the intermediate node, the sending transceiver system configured to send data streams to a subsequent node in the communications network;
   activating a redundant transceiver system of the intermediate node, the redundant transceiver system also configured to send data streams to the subsequent node; and
   routing data streams received by the receiving transceiver system for transmission by the redundant transceiver system.

10. The method of claim 1, wherein the instruction comprises at least one from the group consisting of a node resource monitoring instruction, a node round-trip time instruction, and a node operational fault instruction.

11. A method for transmitting data through a communications network comprising a plurality of nodes, each node comprising a plurality of transceiver systems, the method comprising:
   receiving, using a receiving transceiver system of an intermediate node in the communications network, a data stream comprising payload data and management data, the management data configured to monitor and control the nodes of the communications network;
   removing the management data from the data stream;
   transmitting the payload data using a sending transceiver system of the intermediate node;
   identifying, using the intermediate node, a destination node for the management data;
   responsive to identifying the destination node as a node other than the intermediate node, providing the management data to the sending transceiver system; and
   transmitting, using the sending transceiver system to a subsequent node in the communications network.

12. The method of claim 11, wherein the data stream is received at a first transceiver of the receiving transceiver system, the first transceiver configured to transmit and receive data using an optical communications frequency.

13. The method of claim 12, wherein the fast transceiver comprises a free-space optical transceiver configured to transmit and receive data at approximately 2.5 Gigabits per second.

14. The method of claim 11, further comprising:
   receiving the management data at the destination node that is a subsequent node of the communications network;
   executing, at the subsequent node, an instruction communicated by the management data; and
   transmitting a response to the executed instruction from the subsequent node at the optical communications frequency using the first transceiver of the sending or receiving transceiver system.

15. The method of claim 14, wherein executing the instruction contained by the management data comprises:

deactivating a primary sending transceiver system of the destination node, the sending transceiver system configured to send data streams to other nodes in the communications network through a primary communication channel;

activating a redundant transceiver system of the destination node, the redundant transceiver system configured to send data streams to other nodes in the communications network through a redundant communication channel; and routing data streams received by a receiving transceiver system for transmission by the redundant transceiver system.

16. The method of claim 14, wherein transmitting the response at the optical communications frequency using the first transceiver of the sending or receiving transceiver system comprises:

identifying a gap between payload data packets in a transmitted data stream;

inserting the response into the gap in the data stream;

transmitting the response at the optical communications frequency using the first transceiver; and continuing uninterrupted transmission of the payload data.

17. The method of claim 16, wherein the first transceiver comprises:

a switch to temporarily store the response; and a field programmable gate array (FGPA) to retrieve the response from the switch and insert the response into the data stream responsive to the gap being identified.

18. The method of claim 11, further comprising receiving the management data at the destination node that is a subsequent node of the communications network;

executing, at the subsequent node, an instruction communicated by the management data; and transmitting the response to the instruction at a second communications frequency less than or equal to the first communications frequency, using a second transceiver of the sending or receiving transceiver system.

19. The method of claim 18, wherein the second transceiver comprises a radio frequency transceiver configured to transmit and receive data at approximately 2.5 Gigabits per second.

20. A system for transmitting data through a communications network, the system comprising:

a node configured to operate in conjunction with other nodes to form the communications network, the node comprising:

a prior transceiver system configured to exchange data streams with a prior node in the communications network;

a redundant prior transceiver system configured to act as a backup for the prior transceiver system;

a subsequent transceiver system configured to exchange data streams with a subsequent node in the communications network;

a redundant subsequent transceiver system configured to act as a backup for the subsequent transceiver system;

each of the above transceiver systems comprising:

a first transceiver configured to exchange data streams at a first communications frequency;

a second transceiver configured to exchange data streams at a second communications frequency that is less than or equal to the first communications frequency;

a computing device electronically coupled to the transceivers, the computing device configured to:

remove management data from incoming data streams;

process the management data; and inserting the management data or responses to the management data into outgoing data streams.

21. The system of claim 20, wherein the first transceiver comprises a free-space optical transceiver configured to transmit and receive data at approximately 2.5 Gigabits per second.

22. The system of claim 20, wherein the first transceiver further comprises machine executable instructions configured for execution by a processor, the execution of the instructions comprising:

identifying a gap between payload data packets in a transmitted data stream;

inserting the response into the gap in the data stream;

transmitting the response at the optical communications frequency using the first transceiver; and continuing uninterrupted transmission of the payload data.

23. The system of claim 20, wherein the first transceiver comprises a switch to store data without buffering.

24. The system of claim 20, wherein a response to the instruction is transmitted at a second communications frequency less than or equal to the first communications frequency, and is transmitted using a second transceiver of the sending or receiving transceiver system.

25. The system of claim 20, wherein the second transceiver comprises a radio frequency transceiver configured to transmit and receive data at approximately 2.5 Gigabits per second.

26. A system for transmitting data through a communications network, the system comprising:

a first terminal node configured to communicate with a second terminal node through a plurality of intermediate nodes to form the communications network having a primary communication path and a redundant communication path;

each terminal node comprising:

a primary transceiver system configured to communicate with a similar transceiver system of a nearest intermediate node;

a redundant transceiver system configured to communicate with a similar redundant transceiver system of the nearest intermediate node;

each node intermediate node comprising:

a prior primary transceiver system configured to communicate with a similar primary transceiver system of a prior node;

a prior redundant transceiver system configured to communicate with a similar redundant transceiver system of the prior node;

a subsequent primary transceiver system configured to communicate with a similar primary transceiver system of a subsequent node; and a subsequent redundant transceiver system configured to communicate with a similar redundant transceiver system of the subsequent node.

27. The system of claim 26 comprising a switch for routing payload data between the primary communication path and the redundant communication path responsive to an instruction from the processor.

28. A method for transmitting data through a communications network comprising a plurality of nodes, each node comprising a plurality of transceiver systems, the method comprising:

receiving, using a receiving transceiver system of an intermediate node, a data stream comprising payload data and management data, the management data configured to monitor and control the nodes of the communications network;

removing the management data from the data stream and transmitting the payload data at a first transmission frequency using a first transceiver of the first transceiver system;

identifying a destination for the management data; and transmitting the management data to a subsequent transceiver system at a second transmission frequency that is less than or equal to the first transmission frequency.

* * * * *

UNITED STATES PATENT AND TRADEMARK OFFICE
CERTIFICATE OF CORRECTION

PATENT NO.         : 8,971,720 B2
APPLICATION NO.    : 13/799457
DATED              : March 3, 2015
INVENTOR(S)        : Eric Saint Georges et al.

Page 1 of 1

It is certified that error appears in the above-identified patent and that said Letters Patent is hereby corrected as shown below:

In The Claims
Claim 13, column 12, line 53, delete "fast", and insert --first--.
Claim 26, column 14, line 45, after the word "each" and before the words "intermediate note" delete "node".

Signed and Sealed this
Eighth Day of March, 2016

Michelle K. Lee
*Director of the United States Patent and Trademark Office*